United States Patent
Li et al.

(10) Patent No.: US 9,264,689 B2
(45) Date of Patent: Feb. 16, 2016

(54) SYSTEMS AND METHODS FOR COLOR COMPENSATION IN MULTI-VIEW VIDEO

(75) Inventors: Dong Li, Cupertino, CA (US); Qun Sun, San Jose, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 922 days.

(21) Appl. No.: 13/412,730

(22) Filed: Mar. 6, 2012

(65) Prior Publication Data
US 2013/0033585 A1    Feb. 7, 2013

Related U.S. Application Data

(60) Provisional application No. 61/515,074, filed on Aug. 4, 2011.

(51) Int. Cl.
| | | |
|---|---|---|
| H04N 13/02 | (2006.01) | |
| H04N 5/235 | (2006.01) | |
| H04N 9/09 | (2006.01) | |
| H04N 13/00 | (2006.01) | |

(52) U.S. Cl.
CPC ....... *H04N 13/0025* (2013.01); *H04N 13/0037* (2013.01); *H04N 13/0239* (2013.01); *H04N 13/0242* (2013.01); *H04N 13/0246* (2013.01)

(58) Field of Classification Search
None
See application file for complete search history.

(56) References Cited

U.S. PATENT DOCUMENTS

| | | | | |
|---|---|---|---|---|
| 2001/0009438 | A1* | 7/2001 | Kihara et al. | 348/223 |
| 2002/0027604 | A1* | 3/2002 | Hung | 348/239 |
| 2003/0161608 | A1* | 8/2003 | Nishijima | H04N 1/2307 386/240 |
| 2005/0276508 | A1* | 12/2005 | Coleman | G06K 9/40 382/275 |
| 2007/0120984 | A1* | 5/2007 | Nakabayashi | 348/222.1 |
| 2009/0015689 | A1* | 1/2009 | Murayama | 348/229.1 |
| 2009/0297024 | A1* | 12/2009 | Dai | G06K 9/00456 382/165 |

* cited by examiner

*Primary Examiner* — Chikaodili E Anyikire
*Assistant Examiner* — Maryam Nasri
(74) *Attorney, Agent, or Firm* — Joseph F. Guihan

(57) ABSTRACT

An apparatus and a method for color compensation in multi-view video is provided. Video sequences corresponding to a common scene of interest are captured and processed using the master and slave channels respectively. A compensation gain is calculated based on a set of global color ratio statistics obtained from the master and slave channels. The compensation gain is applied to the slave channel. An initial master color correction matrix is combined with a master color matching matrix to obtain a final master color correction matrix. The initial slave color correction matrix is combined with a slave color matching matrix to obtain a final slave color correction matrix. The master and gain-compensated slave channels are color-compensated by applying the final master and final slave color correction matrices to the master and gain-compensated slave channels, respectively.

14 Claims, 4 Drawing Sheets

SYSTEMS AND METHODS FOR COLOR COMPENSATION IN MULTI-VIEW VIDEO

CROSS REFERENCE TO RELATED APPLICATIONS

This application claims priority to U.S. Provisional Patent Application No. 61/515,074, entitled "SYSTEMS AND METHODS FOR COLOR COMPENSATION IN MULTI-VIEW VIDEO," filed on Aug. 4, 2011. The contents of this provisional application are incorporated herein by reference in their entirety.

FIELD OF THE INVENTION

The present invention relates to systems and methods of compensating the color difference between two or more video sequences acquired from a common scene of interest.

BACKGROUND

Multi-view video consists of multiple video sequences, simultaneously acquired from a common scene of interest, but taken from different viewpoints and/or angles. This concept appears in numerous contemporary and cutting edge technologies, including stereoscopic (two-view) video and free viewpoint television. In multi-view 3D television, a common scene may be captured by several cameras to form a 3D multi-view video. Multi-view video also has significant use in security and surveillance applications. The multiple video sequences captured from different viewpoints may be combined to form a single video stream.

BRIEF DESCRIPTION OF THE DRAWINGS

For a more complete understanding of the nature and benefits of the invention, reference should be made to the following detailed description taken in conjunction with the accompanying drawings, in which.

DETAILED DESCRIPTION OF THE INVENTION

Figure 1:
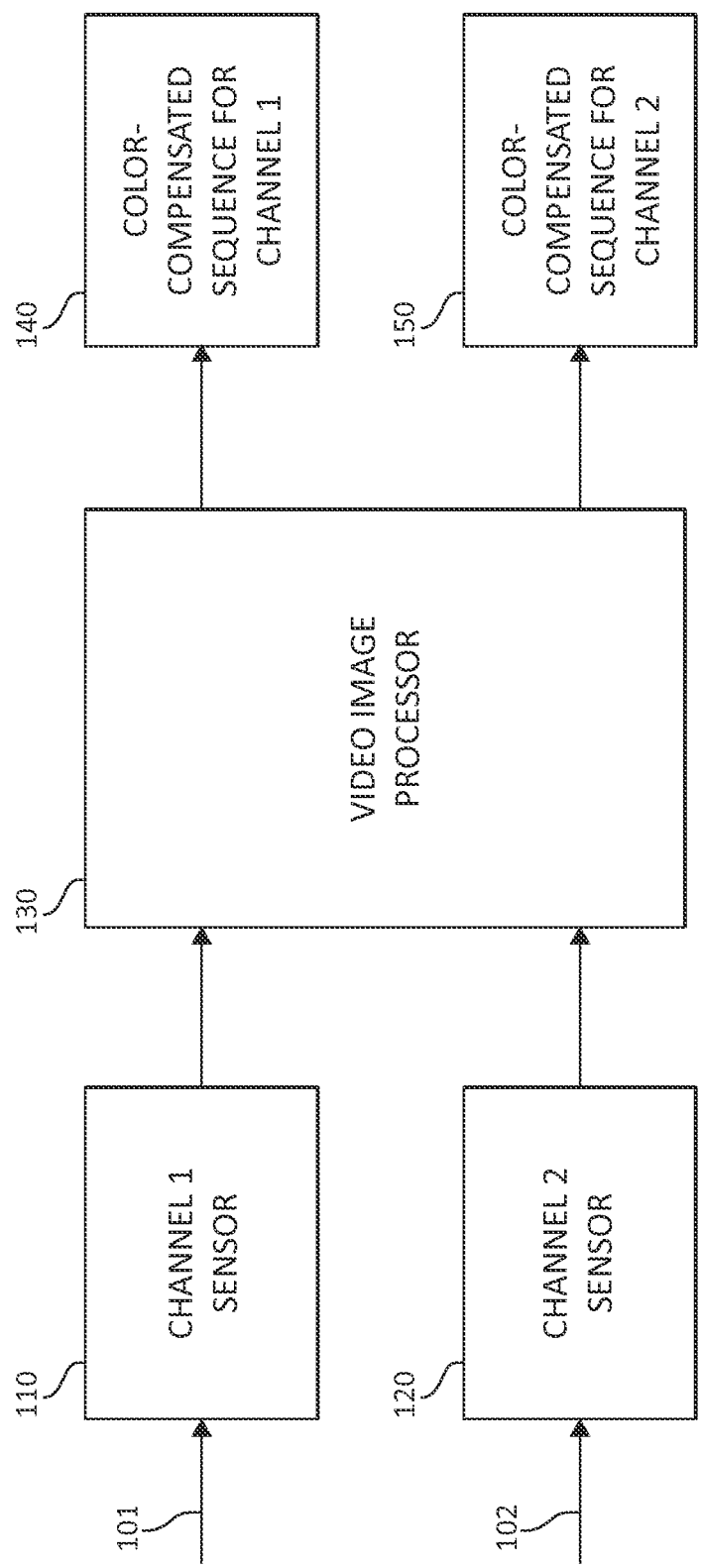
FIG. 1 is a functional block diagram of a system according to an example embodiment of the invention.

There is shown in FIG. 1 a block diagram in which a channel 1 sensor 110 and a channel 2 sensor 120 respectively sense a first video sequence 101 and a second video sequence 102. Because multi-view video incorporates the use of a plurality of cameras, appreciable differences may exist among the captured video sequences 101, 102. For example, the captured video sequences 101, 102 may exhibit visible differences in color. Several factors can drive this color difference, including variation among the camera sensors in one or more of the following areas: lens characteristics; infrared cut-off filter; color filter array; pixel response; viewing conditions; lighting conditions; and color shading effects.

The differences in color caused by these disparities, depending on the magnitude, may lead to one or more undesirable effects. Eye fatigue and/or considerable discomfort may occur after prolonged viewing. Additionally, color differences may adversely affect algorithms, such as video coding, that depend upon color correspondence.

The inventors have discovered that a combination of initial global color matching and color matching matrices can dramatically improve color matching among video sequences. According to an embodiment of the invention, a video image processor 130 applies a color matching algorithm which compensates, either fully or partially (e.g., to a tolerable extent), for differences in color between the captured video sequences 101, 102 in order to mitigate, among other things, the above mentioned undesirable effects. The result of the color matching algorithm applied by the video image processor 130 is a color-compensated sequence 140 for channel 1 and a color-compensated sequence 150 for channel 2.

Figure 2:
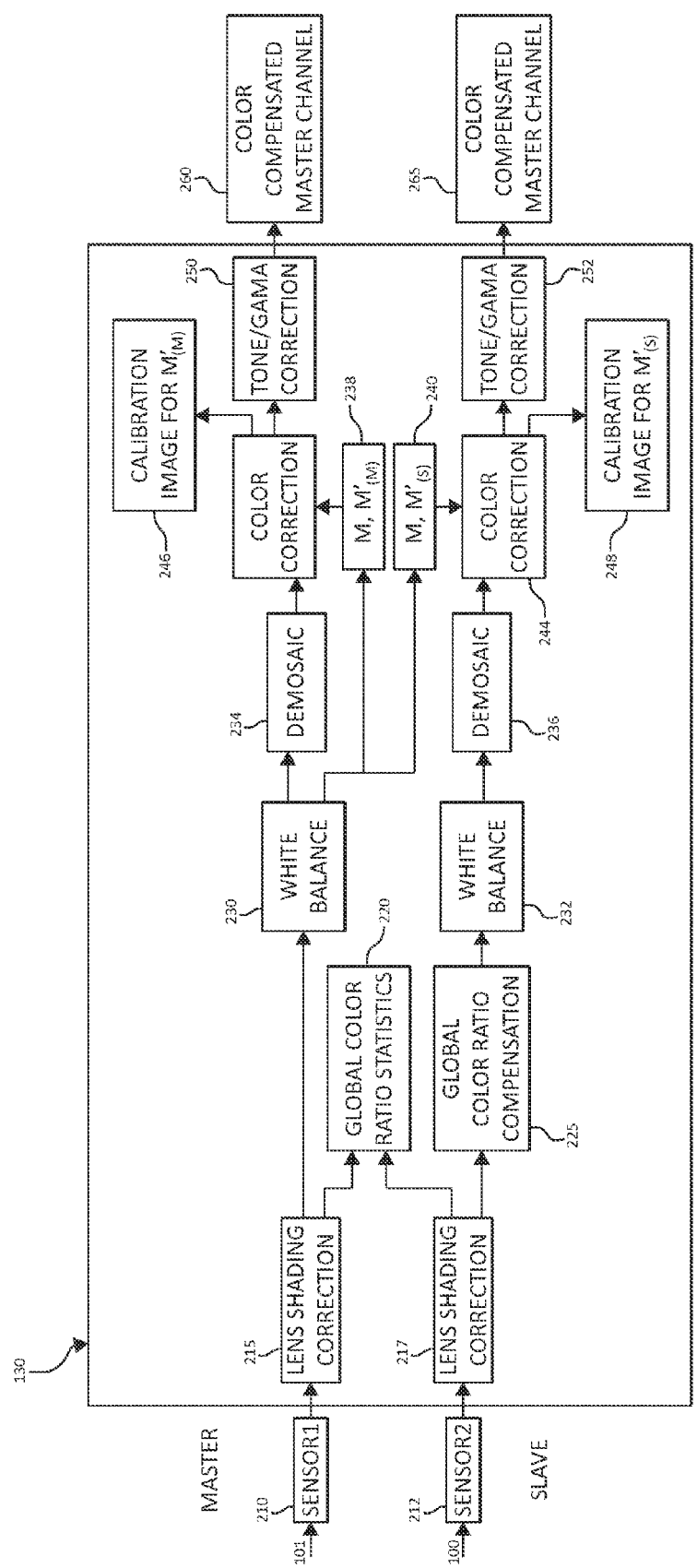
FIG. 2 is a functional block diagram of a method according to an example embodiment of the invention having two channels.

There is shown in FIG. 2 a functional block diagram 200 illustrating a method according to an example embodiment of the invention for processing the video sequences sensed by the channel 1 sensor 110 and the channel 2 sensor 120. In this example, the channel 1 sensor 110 is the "master" and channel 2 sensor 120 is the "slave." Assuming that each channel within the system is characterized by similar viewing and lighting conditions, either channel may be designated the master channel and the other the slave channel. Without similar conditions, it is desirable that the master channel correspond to the camera having the best characteristics in this regard. Also, preferably, the master channel and the slave channel correspond to cameras capturing images of a common scene with an image size that permits, for example, estimation of average red, green, blue (RGB) responses, histogram analysis and pattern recognition. A common scene of interest, as used herein, includes the scenario where all of the cameras capture at least some, a significant portion, or preferably all of a given scene.

First, video sequences 101 and 102, concerning a common scene of interest, are captured by the master and slave channels by sensors 210 and 212 respectively. Processing by the video image processor 130 includes a series of steps, commencing preferably with lens shading correction of the master and slave channels in steps 215 and 217. Lens shading correction may be appropriate where the image displays non-uniform brightness caused by non-uniform illumination, non-uniform camera sensitivity, or even dirt and dust on glass (lens) surfaces. Various known algorithms may be applied to conduct lens shading correction in steps 215 and 217. Some example algorithms concerning lens shading correction are provided in U.S. Pat. No. 8,089,534, entitled "Multi Illuminant Shading Correction Using Singular Value Decomposition," the contents of which are hereby incorporated by reference.

Figure 3:
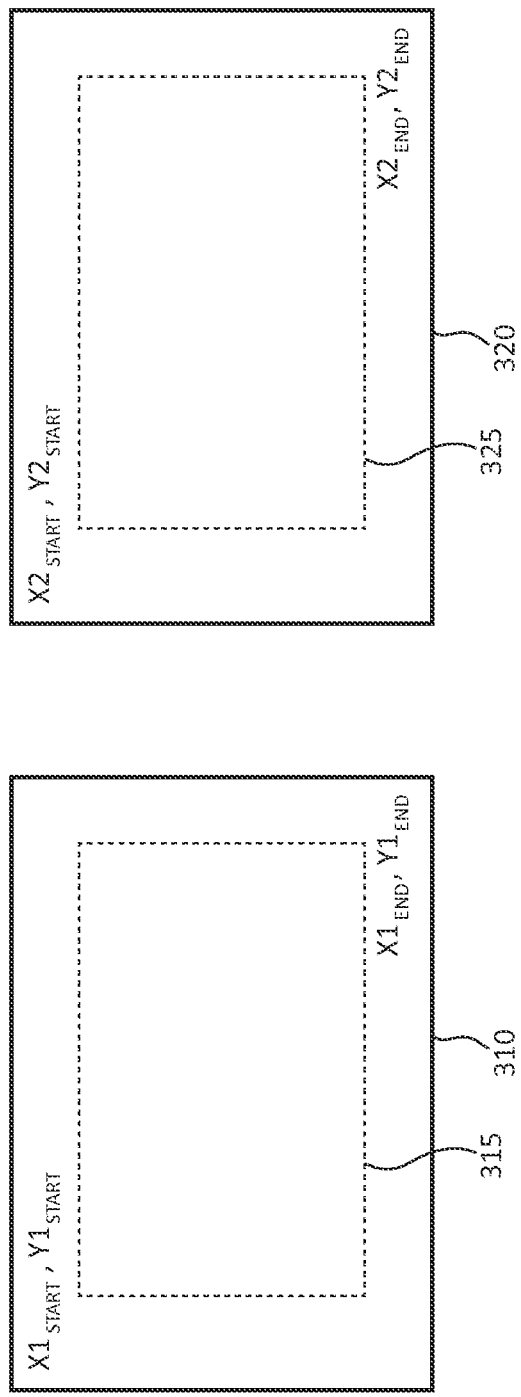
FIG. 3 illustrates image blocks within an image sensed by a master and slave channel.

Global color ratio statistics are collected from the master and slave channels by process 220. In this step, raw Bayer data, designated as R1, Gr1, Gb1, and B1 for the master channel 110 and as R2, Gr2, Gb2, and B2 for the slave channel 120, is collected. The sum of these characteristics for each individual channel is taken with respect to image blocks of a predetermined size. Turning briefly to FIG. 3, a master channel image 310 contains a master image block 315 and a slave channel image 320 contains a slave image block 325. The size of master and slave image blocks 315, 320 is defined by $(x1_{start}, y1_{start})$, $(x1_{end}, y1_{end})$ and $(x2_{start}, y2_{start})$, $(x2_{end}, y2_{end})$.

Preferably, the image content in the master and slave image blocks 315, 320 is approximately equivalent, for example, covering the same field of view but with a parallax between the two image sequences. Simple calibration may be used to establish similarity between the master and slave image blocks 315, 320. However, with simple calibration, images sizes among the image blocks 315, 320 may be different in the individual sensor image domain. Automatic calibration using image pattern/structure recognition technology may also be used. Again, the image size may differ here due to variance in the imaging angles. It may also be acceptable to assume that the image content in master and slave image blocks 315, 320 is equivalent. Equivalency may be established through one or more of the aforementioned methods, or other known methods.

With equivalency established between the image content in master and slave image blocks 315, 320, the average value of the raw Bayer data within master and slave image blocks 315, 320 for master and slave channels 110, 120 is:

$$Avg_{R1} = \Sigma R1/size_{R1} \qquad Avg_{R2} = \Sigma R2/size_{R2}$$
$$Avg_{Gr1} = \Sigma Gr1/size_{Gr1} \qquad Avg_{Gr2} = \Sigma Gr2/size_{Gr2}$$
$$Avg_{Gb1} = \Sigma Gb1/size_{Gb1} \qquad Avg_{Gb2} = \Sigma Gb2/size_{Gb2}$$
$$Avg_{B1} = \Sigma B1/size_{B1} \qquad Avg_{B2} = \Sigma B2/size_{B2}$$

Here, the total sum of Bayer data within master image blocks 315 for R1, Gr1, Gb1, and B1 are represented by $\Sigma R1$, $\Sigma Gr1$, $\Sigma Gb1$ and $\Sigma B1$. The total data size for image blocks 315 are represented by $size_{R1}$, $size_{Gr1}$, $size_{Gb1}$ and $size_{B1}$, respectively. Similarly, the total sum of Bayer data within slave image blocks 320 for R2, Gr2, and B2 are represented by $\Sigma R2$, $\Sigma Gr2$, $\Sigma Gb2$ and $\Sigma B2$. The data size for image blocks 320 are represented by $size_{R2}$, $size_{Gr2}$, $size_{Gb2}$ and $size_{B2}$, respectively.

Turning back to FIG. 2, after the collection of global color ratio statistics in step 220, the compensation gains are calculated and applied to the slave channel 120 in step 225. The compensation gains are calculated as follows:

$$gain_R = Avg_{R1}/Avg_{R2}$$

$$gain_{Gr} = Avg_{Gr1}/Avg_{Gr2}$$

$$gain_{Gb} = Avg_{Gb1}/Avg_{Gb2}$$

$$gain_B = Avg_{B1}/Avg_{B2}$$

The compensation gains are then applied to the slave channel 120 before the white balance block (i.e., where the video image is adjusted so that white objects appear white) in step 232. After white balance block processing in steps 230 and 232 respectively, the master and slave channels 110, 120 are subject to known demosaicing operations in steps 234 and 236. The demosaicing operations estimate red, green, and blue color values for each pixel position from the Bayer pixel values.

After application of the compensation gain in step 225, color differences may still exist between the master and slave channels 110, 120. For further color compensation, a color correction matrix (M) and color matching matrices for master ($M'_{(M)}$) and slave ($M'_{(s)}$) channels 110, 120 are generated in steps 238 and 240. In steps 238 and 240, a golden camera may be selected for calibration. Preferably, the golden camera has color ratios (R/G and B/G) that fall towards the statistical mean.

Figure 4:
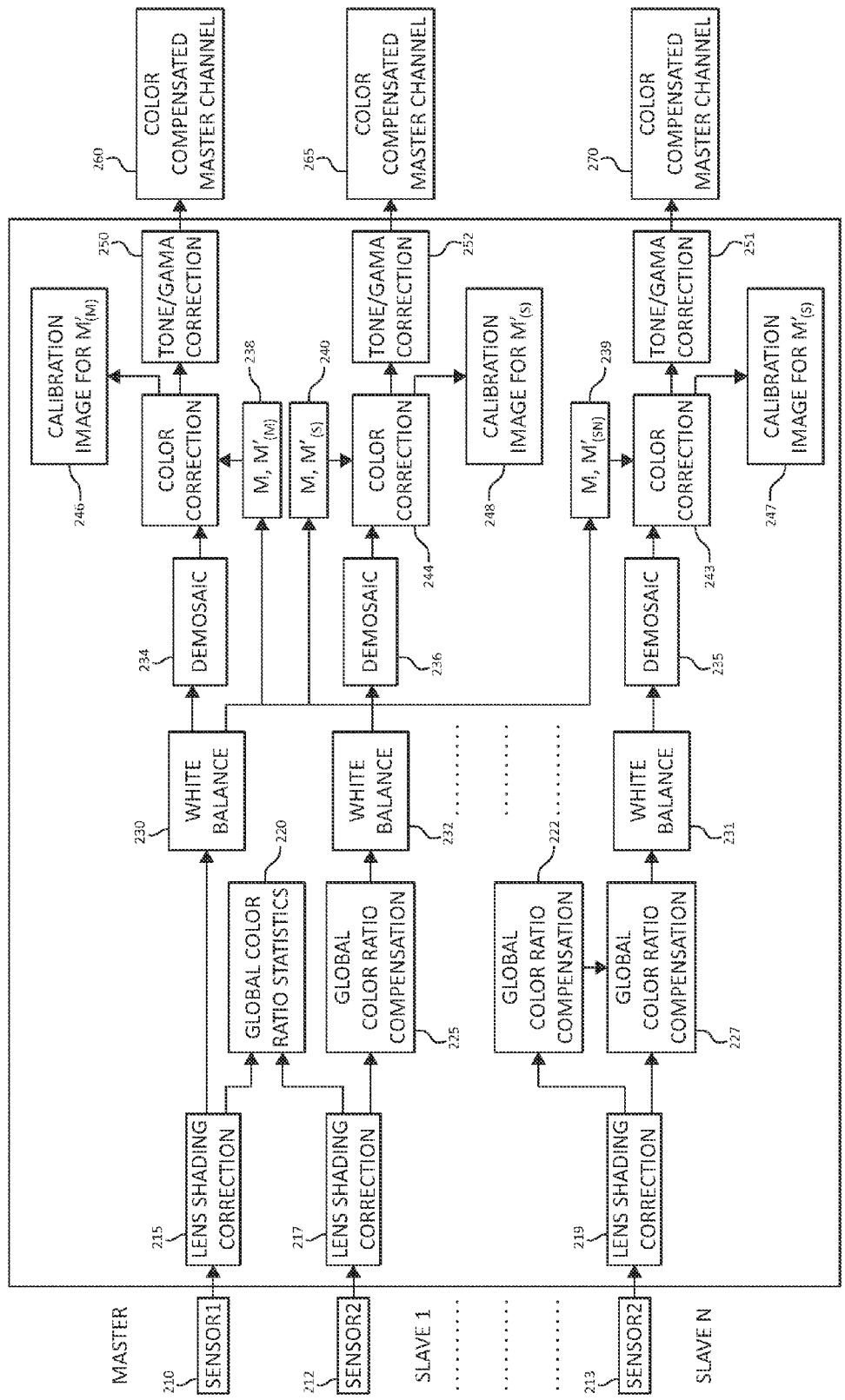
FIG. 4 is a functional block diagram of a method according to an example embodiment of the invention having N channels.

The master camera may be designated as the golden camera. However, if calibration is limited to color matching between the master and slave camera, as shown in FIG. 2, or the master and multiple slave cameras, as shown in FIG. 4, the results may not match the standard reference. This concern is emphasized when the master camera's color response deviates significantly from the statistical mean.

Optionally, a golden camera may be avoided all together, and each individual camera may be calibrated directly with the standard reference. Without a golden camera, however, it may be difficult to establish that the lighting conditions are sufficiently accurate.

In steps 238 and 240, the golden camera is subjected to color matching calibration with color targets, such as Macbeth ColorChecker chart, and using a standard illuminant reference and observer. An exemplary calibration includes the CIE 1931 standard colorimetric observer at selected illuminants, including illuminant A and D65. The raw responses of the golden camera to the 24 color patches of the Macbeth Color Checker chart may be designated as $rgb_{24\times 3}$. The standard reference colors here are generally related to a display color space, such as the standard RGB (sRGB) color space. A chromatic adaptation model may also be used to predict human color vision perception.

If the standard reference colors (which may be defined just prior to tone/gamma correction steps 250, 252) at a predetermined illuminant is $RGB_{24\times 3}$, then the following relationship may be established:

$$RGB_{24\times 3} = rgb_{24\times 3} \cdot M_{3\times 3}$$

Several methods exist to estimate $M_{3\times 3}$, including the least squares method. It may be desirable to additionally determine the color matching matrices for the golden camera at different illuminants, i.e., illuminants A and D65. In particular, the color matching matrix at an illuminant whose white point falls into or close to the blackbody white point locus between illuminant A and D65, in terms of correlated color temperature, can generally be interpolated based on matrices at illuminant A and D65. For some illuminants, i.e., those illuminants which have white points which fall away from blackbody white point locus (such as fluorescents), it may be desirable to provide additional calibration because the color matching matrices may not be interpolated accurately. In this regard, the 3×3 color matching matrices for the golden camera at illuminants A and D65 are assumed to be $M_A$ and $M_{D65}$ respectively.

After determining $M_{3\times 3}$, each camera in the system may be calibrated with the golden camera for color matching to determine the color matching matrix $M'_{3\times 3}$ for that camera. The raw color responses of the golden camera and the camera to be calibrated may be designated as $rgb_{24\times 3}$ and $rgb'_{24\times 3}$. $rgb_{24\times 3}$ and $rgb'_{24\times 3}$ may be obtained in calibration image blocks (e.g., 246, 248, and 247). Preferably, $M_{3\times 3}$ has been applied in color correction block (242, 244, and 243).

The color matching matrix between the golden camera and the camera to be calibrated, $M'_{3\times 3}$, may be obtained according to the following equation:

$$rgb_{24\times 3} = rgb'_{24\times 3} \cdot M'_{3\times 3}$$

Among other available optimization methods, the least squares method may be used to determine $M'_{3\times 3}$. Specifically, M' for the master channel 110 is $M'_{D65(m)}$ and $M'_{A(m)}$ at illuminants D65 and A respectively. Likewise, M' for the slave channel is $M'_{D65(s)}$ and $M'_{A(S)}$ at illuminants D65 and A respectively. Generation of the color matching matrix (M') similar to generation of the color correction matrix (M) in that the R, G, and B values of the 24 color patches of the Macbeth Color Checker chart may be designated as $rgb_{24\times 3}$ in the above equation.

Application of the color correction matrix (M) to the master and slave channels 110, 120 occurs in color correction steps 242 and 244. Color matching between the master and slave channels 110, 120 includes integration of the color correction and color matching matrices. One method of color matching here includes designating final color correction matrices for each of the master and slave channels 110, 120, i.e., $CCM_{(m)}$ and $CCM_{(s)}$. For the master channel 110, the following relationships, at illuminants A and D65, are established:

$$CCM_{D65(m)} = M_{D65} \cdot M'_{D65(m)}; CCM_{A(m)} = M_A \cdot M'_{A(m)}$$

Similarly, the following relationships at the same illuminants are established for the slave channel 120:

$$CCM_{D65(s)} = M_{D65} \cdot M'_{D65(s)}; CCM_{A(s)} = M_A \cdot M'_{A(s)}$$

From these results, interpolation may be used to obtain $CCM_{(m)}$ and $CCM_{(s)}$ at other illuminants. Specifically, $CCM_{(m)}$ and $CCM_{(s)}$ may be obtained by interpolating CCM for each channel under illuminants A and D65 in accordance with a given interpolation scheme. For the master channel 110, the relationship is as follows:

$$CCM_{(m)} = \text{interpolation}(CCM_{A(m)}, CCM_{D65(m)})$$

The final color correction matrix for the slave channel 120 is obtained similarly:

$$CCM_{(s)} = \text{interpolation}(CCM_{A(s)}, CCM_{D65(s)})$$

One interpolation basis, potentially dependent upon the specific image signal processing (ISP) algorithms employed, may be the white point or color temperature of the illumination estimated in the white balance block processes 230, 232.

For some illuminants, the CCM interpolation may use a look-up table (LUT) to select the desired color correction matrix (combined with color matching matrix) based on illuminant white point or color temperature information, such as the fluorescents described above. In an example embodiment, the camera system may have a selector interface that allows a user to indicate the illuminant (e.g., fluorescent for indoor scenes, illuminants B or C for outdoor scenes). In an alternative example, the user may allow the system to determine the illuminant by pointing the camera at a white object in the scene and measuring the red, green, and blue signals. In either case, an address value representing the determined illuminant may be applied to the LUT and the LUT may provide the appropriate color correction matrix for the illuminant.

The need for interpolation may be avoided by specifying the use of only one middle illuminant, e.g. an illuminant in the 4500K CCT range, to conduct color matching between the golden camera and the camera to be calibrated in processes 238, 240. Because the 3×3 color matching matrix M' performs both the rotation and scaling transformation operations, simplification to one middle illuminant allows $M_m$ to replace both $M_{D65(m)}$ and $M_{A(m)}$, as well as $M_s$ to replace $M_{D65(s)}$ and $M_{A(s)}$. Thus, the need for interpolation may be avoided.

M' may alternatively be simplified by using a diagonal matrix. This approach may be desirable in order to constrain implementation costs, or where only a scaling operator is needed. Under these conditions, during the camera color matching calibration in processes 238, 240, only white patches or gray patches from the Macbeth Color Checker chart may be used to determine the color ratio difference between the master and slave channels 110, 120 with respect to the golden camera.

Yet another cost-effective simplification of the above described inventive process includes setting M' as a unit matrix. Here, assuming no color rotation transformation is necessary or desirable, color correction is otherwise limited to process 225 in which the global color ratio compensation is applied to slave channel 120. This approach is especially suitable, for example, in ad-hoc situations where calibration is undesirable or infeasible because a standard reference may be unavailable. In a two camera/channel system, such as that depicted in FIG. 2, it may be desirable to add a switch that allows the user to designate the master and slave channel in order to avoid the possibility that a less desirable camera is selected as the master channel.

After color correction steps 242, 244, the master and slave channels are subject to tone and gamma correction in steps 250, 252, which is the last step before the color compensated master and slave channels result in steps 260 and 265.

In another embodiment, depicted by FIG. 4, a single master channel 110 and its associated plurality of slave channels are subject to the inventive color matching methods described herein. The process described above is substantially similar, excepting for slight alterations due to the inclusion of N-number of slave channels. For example, collection of global color ratio statistics between the master channel 110 and each slave channel occurs in processes 220 and 222, and gain compensation of each slave channel occurs in processes 225 and 227. Likewise, the color correction matrix (M) and color matching matrices for the master channel 110 ($M'_{(M)}$) and the first slave channel 120 ($M'_{(S1)}$) through the slave N channel 122 ($M'_{(SN)}$) are generated in steps 238 and 240. Finally, color correction steps 242, 243, and 244 proceed for the master and each of the N slave channels with respect to the golden camera as described above.

In yet another embodiment, the color matching methods described herein are applied to a system having a plurality of master channels, wherein each master channel is associated with one or more slave channels, consistent with FIG. 1 or 2. This configuration is particularly advantageous where the multi-view video system includes many cameras with significantly different viewing and/or lighting conditions. Groups of cameras, each group having one master and one or more slaves, are preferably defined such that the cameras in each group have the same or similar viewing and/or lighting conditions. Additionally, cameras in the same group should have a common scene field with proper image sizes to facilitate estimation of average R, G, and B responses, as well as histogram and pattern recognition analysis, etc.

The embodiments disclosed herein include an apparatus and a method for color compensation in multi-view video. A first and second video sequence corresponding to a common scene of interest are sensed by a slave and a master channel. A compensation gain is calculated based on a set of global color ratio statistics obtained from the master and slave channels. The compensation gain is applied to the slave channel. An initial color correction matrix is combined with a first color matching matrix to obtain a final master color correction matrix. The initial color correction matrix is combined with a second color matching matrix to obtain a final slave color correction matrix. The master and gain-compensated slave channels are color-compensated by applying the final master and final slave color correction matrices to the master and gain-compensated slave channels, respectively.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for color compensation in multi-view video comprising:
   sensing a first video sequence in a master channel;
   sensing a second video sequence in a slave channel;

wherein the first and second video sequences are acquired from a common scene of interest;

generating a set of global color ratio statistics from the master channel and the slave channel, wherein the global color ratio statistics are based on a ratio of master channel image data to master channel image size and a ratio of slave channel image data to slave channel image size, and wherein the slave channel image size depends on the similarity between a master channel image and a slave channel image;

calculating at least one compensation gain based upon the set of global color ratio statistics; and applying the at least one compensation gain to the slave channel to obtain a gain-compensated first slave channel.

2. The method of claim 1 further comprising:

combining an initial color correction matrix with a first color matching matrix to obtain a final master color correction matrix;

combining an initial color correction matrix with a second color matching matrix to obtain a final slave color correction matrix; and color-compensating the master channel and the gain-compensated slave channel by applying the final master and final slave color correction matrices to the master channel and the gain-compensated slave channel, respectively.

3. The method of claim 2 comprising calibrating a golden camera with a standard reference to generate the initial color correction matrix, wherein the golden camera has color ratios that fall toward a statistical mean.

4. The method of claim 3 comprising calibrating a further camera with the golden camera to generate the color matching matrix.

5. The method of claim 3 wherein the golden camera is the master channel.

6. The method of claim 2 wherein the first and second color matching matrices are unit matrices.

7. The method of claim 1 wherein the set of global color ratio statistics is generated from a first set of Bayer values obtained from the master channel and a second set of Bayer values obtained from the slave channel.

8. The method of claim 1 comprising a plurality of slave channels.

9. The method of claim 1 comprising a plurality of master channels, wherein each of the plurality of master channels is associated with one or more slave channels.

10. A video image processor comprising:
a master channel; and
a slave channel, wherein the video image processor is configured to:
determine a set of global color ratio statistics from the master channel and the slave channel, wherein the global color ratio statistics are based on a ratio of master channel image data to master channel image size and a ratio of slave channel image data to slave channel image size, and wherein the slave channel image size depends on the similarity between a master channel image and a slave channel image;
calculate a compensation gain based upon the set of global color ratio statistics; and
apply the compensation gain to the slave channel.

11. The video image processor of claim 10 further comprising a plurality of slave channels.

12. The video image processor of claim 11 further comprising a plurality of master channels, wherein each master channel is associated with one or more slave channels.

13. The method of claim 2 wherein the initial color correction matrix is a unit matrix.

14. The method of claim 10, wherein the video image processor is configured to:
generate a master channel color correction matrix;
generate a slave channel color correction matrix; and
apply the master channel and the slave channel color correction matrices to the master channel and slave channel respectively to generate a color compensated video image.

* * * * *